Figure 1:
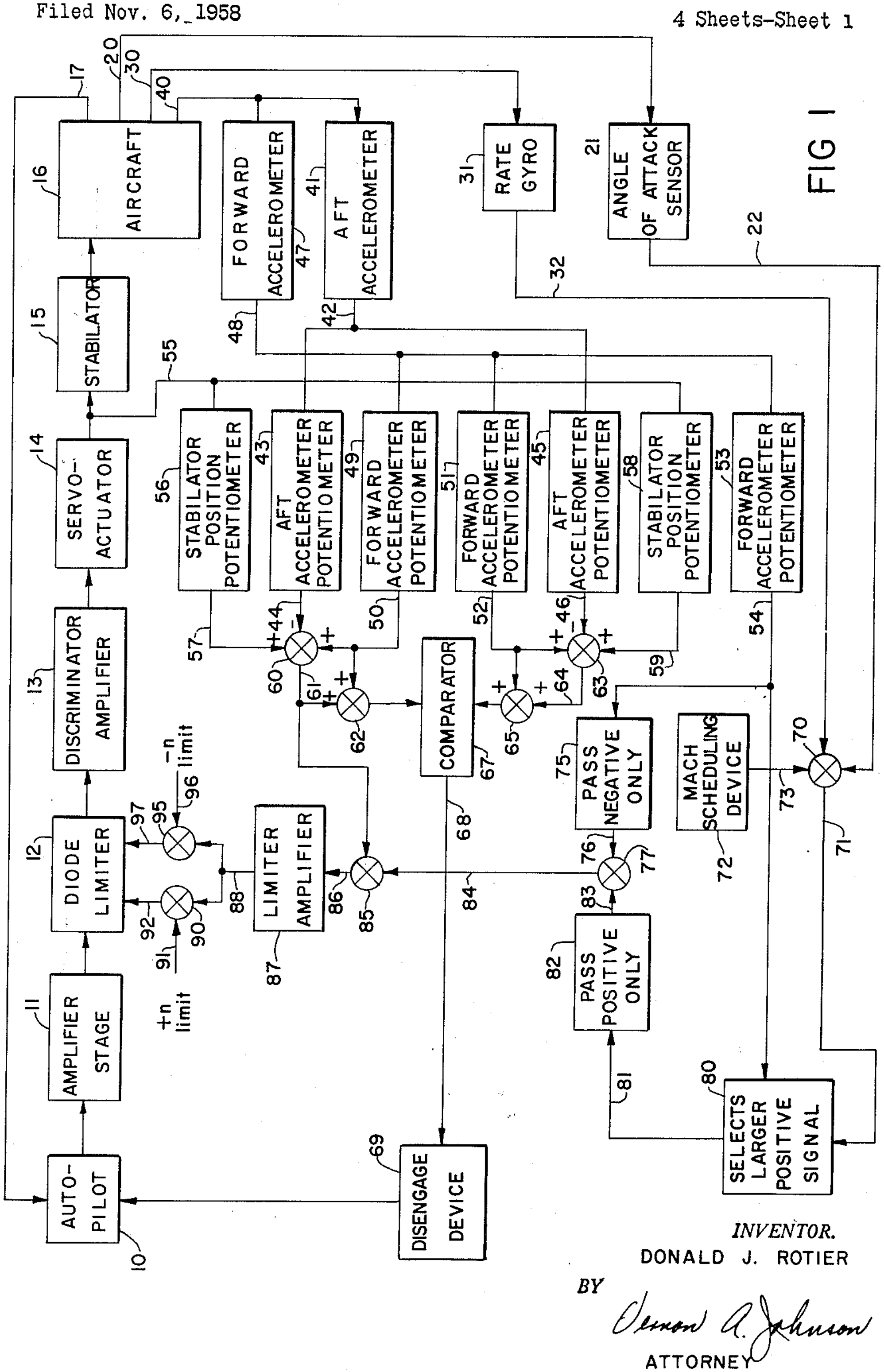

Aug. 28, 1962 D. J. ROTIER 3,051,416

MANEUVER LIMITING AUTOPILOT MONITOR

Filed Nov. 6, 1958 4 Sheets-Sheet 1

INVENTOR.
DONALD J. ROTIER

BY Vernon A. Johnson
ATTORNEY

MANEUVER LIMITING AUTOPILOT MONITOR

Filed Nov. 6, 1958 4 Sheets-Sheet 2

INVENTOR.
DONALD J. ROTIER

BY Vernon A. Johnson

ATTORNEY

MANEUVER LIMITING AUTOPILOT MONITOR

Filed Nov. 6, 1958 4 Sheets-Sheet 3

INVENTOR.
DONALD J. ROTIER
BY
Vernon A. Johnson
ATTORNEY

MANEUVER LIMITING AUTOPILOT MONITOR

Filed Nov. 6, 1958 4 Sheets-Sheet 4

INVENTOR.
DONALD J. ROTIER
BY Vernon A. Johnson
ATTORNEY

United States Patent Office 3,051,416

Patented Aug. 28, 1962

3,051,416

MANEUVER LIMITING AUTOPILOT MONITOR

Donald J. Rotier, Minneapolis, Minn., assignor to Minneapolis-Honeywell Regulator Company, Minneapolis, Minn., a corporation of Delaware Filed Nov. 6, 1958, Ser. No. 772,316
29 Claims. (Cl. 244—77)

This invention relates generally to automatic control systems for dirigible craft, and, more particularly, to means for limiting the operation of said control systems to prevent overstressing said craft.

The invention is readily applicable to automatic control systems such as automatic pilots for aircraft or other dirigible craft. In particular, the invention may be applied to controlling the craft about its lateral or pitch axis.

It is well known that an aircraft, and particularly a high speed aircraft, can be structurally damaged or subjected to extreme stall or buffet conditions responsive to excessive control signals and resultant control surface movements. Furthermore, a control surface movement that is not excessive when the aircraft is in one attitude, may be excessive when the aircraft is in another attitude. This difference may be caused by changes in air speed, altitude, acceleration, angle of attack, or any combination of these or other parameters that affect the craft, and more particularly, the pitch axis thereof.

Various control devices have been devised to compensate for this problem by monitoring the craft automatic control system, such as a device known as a disengage limiter circuit, which disengages an automatic pilot of an aircraft when the automatic pilot commands a craft maneuver that would exceed a predetermined limit. This limit could be established, for example, by acceleration sensing means. It has also been found practicable to use a device known as a command signal limiter, which prevents an autopilot from commanding a craft movement that exceeds predetermined limits.

The present invention contemplates the provision of novel safety or monitoring apparatus in a dirigible craft, comprising improved command signal and disengage limiters arranged to monitor the operation of the craft's automatic control system, said disengage limiter additionally being arranged to monitor the operation of said command signal limiter. This arrangement provides the safety of disengage limiting, while preventing nuisance disengagements of the automatic control system during normal operation of the command signal limiter.

Accordingly, it is a primary object of my invention to provide an improved monitor system for an automatic control system in a dirigible craft, comprising improved disengage and command signal limiters.

It is a further object of my invention to provide a monitor system of the type described, wherein said disengage limiter monitors said command signal limiter.

I accomplish these objects in an aircraft control system by combining signals corresponding to aircraft movements, including acceleration, pitch-rate and angle-of-attack signals, with a signal corresponding to control surface position, and by then using the composite signal to modulate preset positive and negative limit signals. These preset signals are determined by the characteristics of the craft under varying speed, altitude, and angle-of-attack conditions, and are selected so as to avoid structural damage due to excessive craft acceleration, the uncomfortable ride caused by buffeting, and the hazards of flying into a pitch-up, engine compressor stall, or airplane stall region. The modulated positive and negative signals are then utilized, in a novel diode limiter arrangement, to clamp the autopilot command signals within the limits corresponding to this modulated signal. Thus, the autopilot command signal is limited so as to maintain safe aircraft control. In addition, a portion of the above mentioned modulating signal, including signals from the acceleration and control surface position sensors, is compared in a novel comparator circuit with a similar signal from another group of similar sensors, and a predetermined difference between these signals is effective to cause disengagement of the automatic control system. Thus, failure of any signal source, or failure of the command signal limiter to maintain the aircraft movements within the established limits, causes disengagement of the automatic control system.

Figure 2:
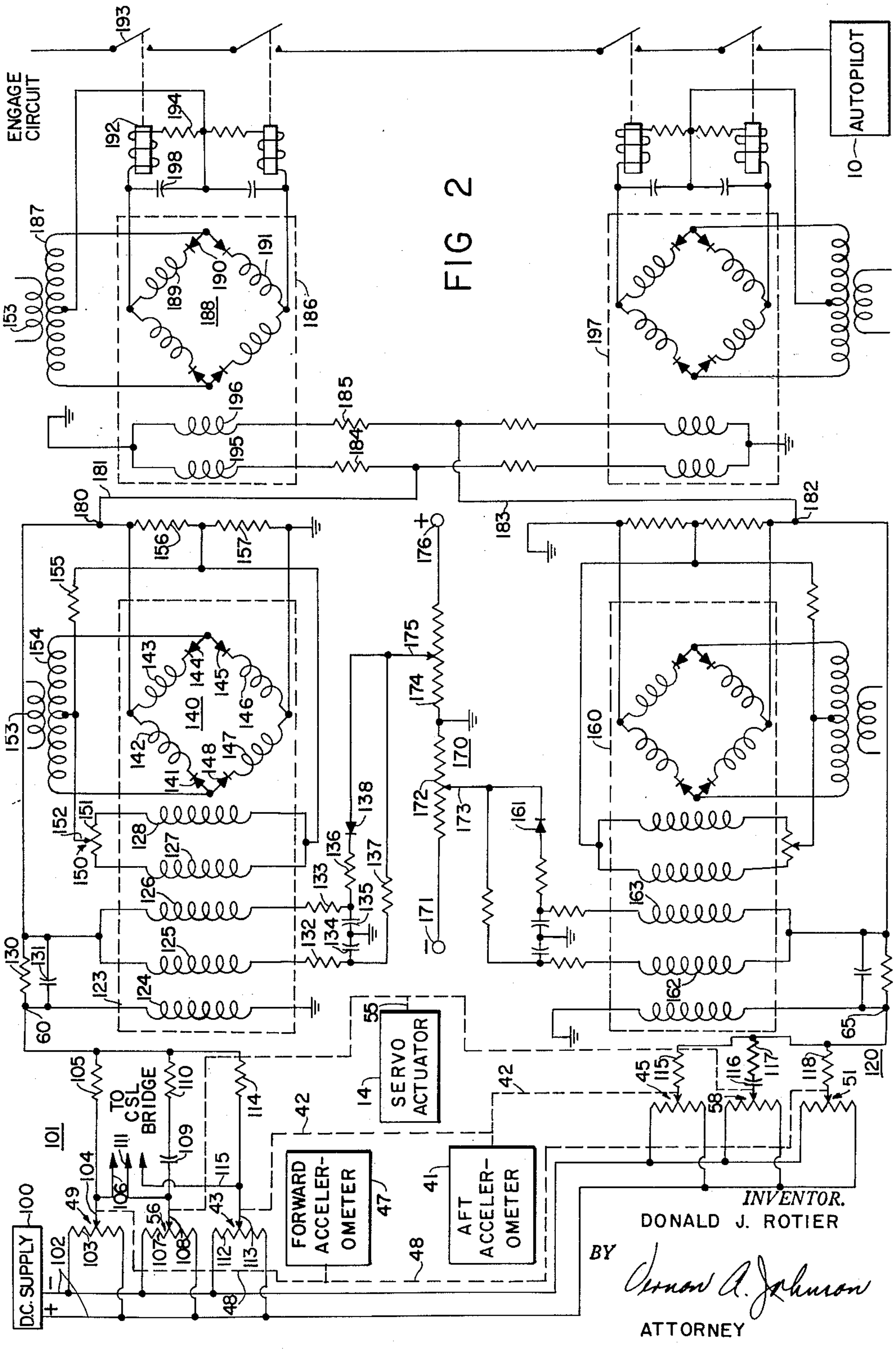
Figure 3:
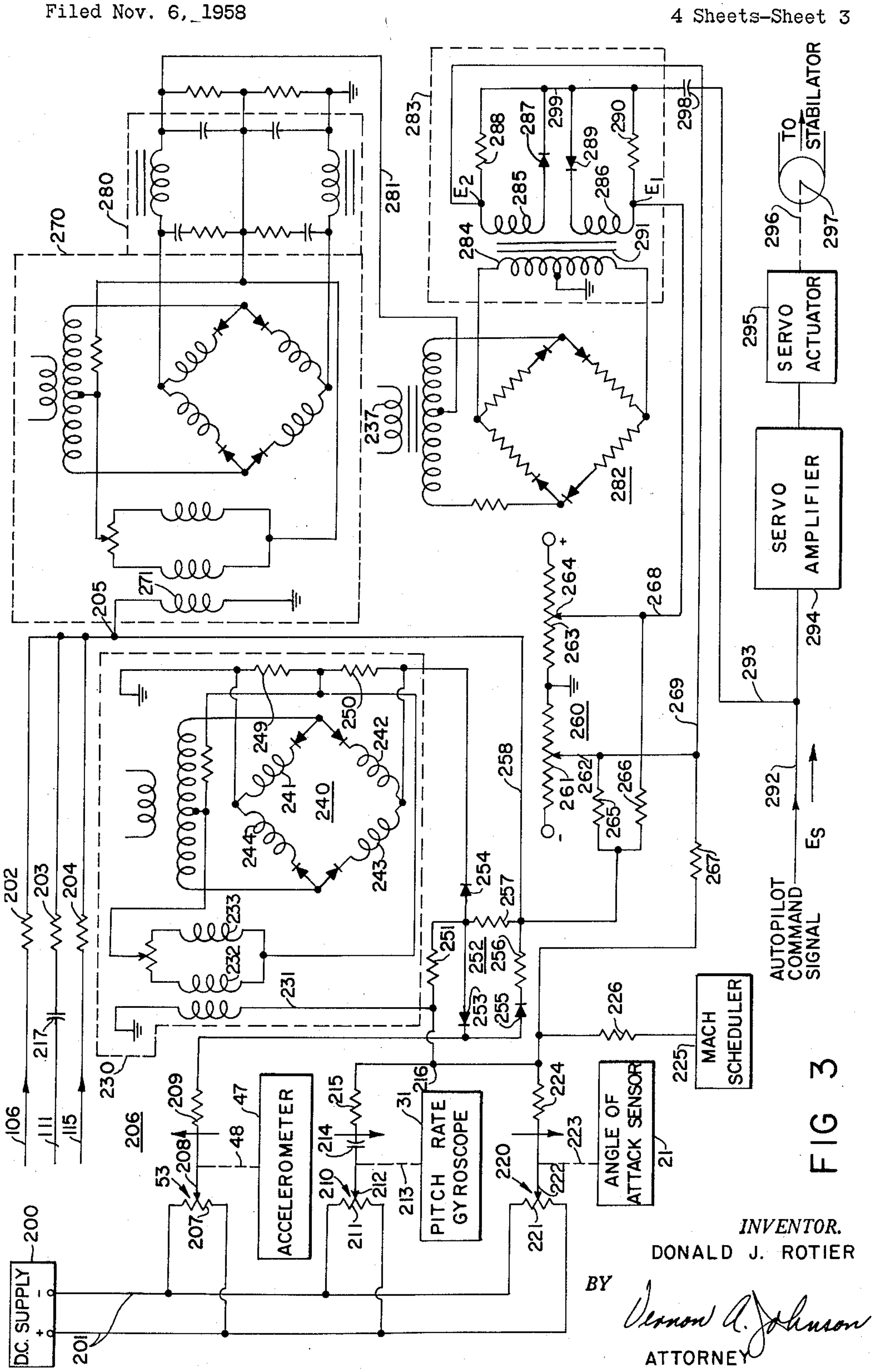
Figure 4:
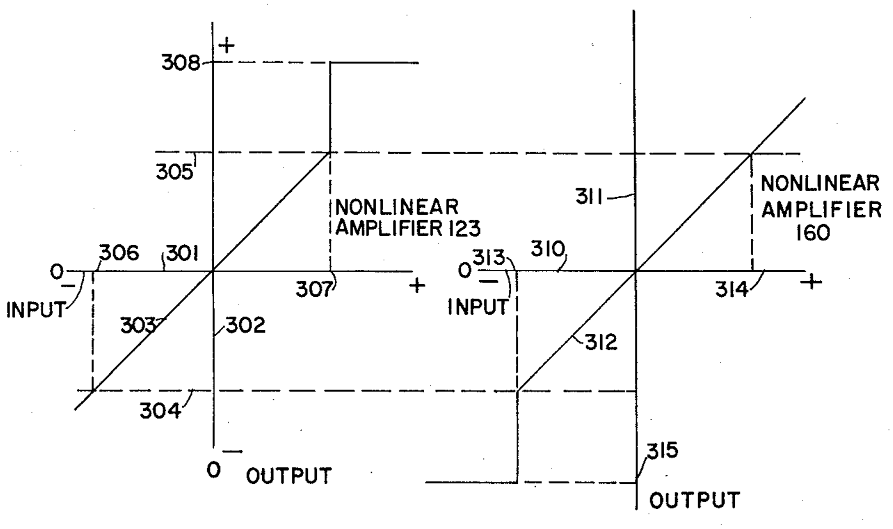
Figure 5:
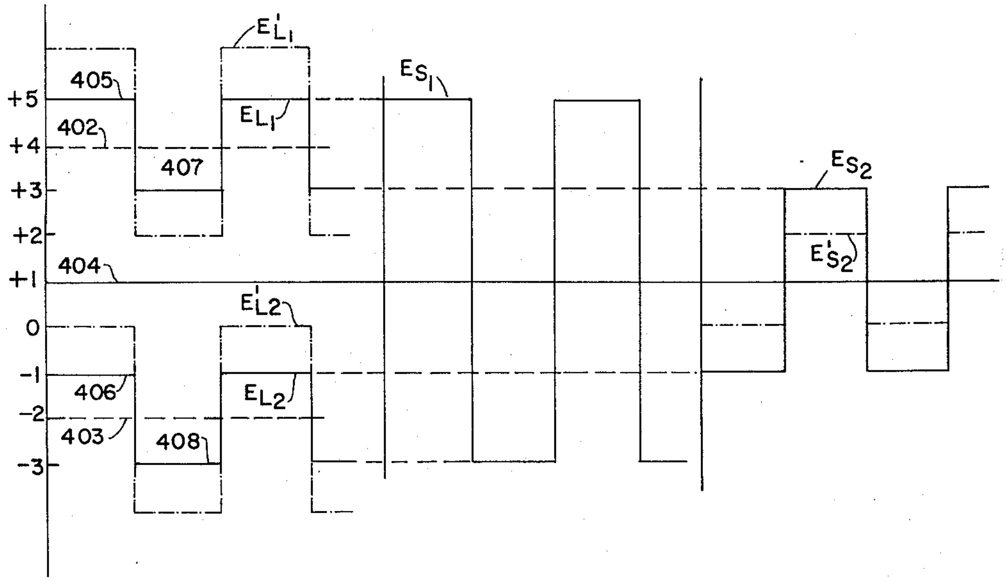

Other objects and features of my invention will be ascertained by a study of the following description of a preferred embodiment of my invention together with the drawings, in which:

FIGURE 1 is a block diagram of the integrated limiter system,

FIGURE 2 is a detailed schematic diagram of the disengage limiter portion of my invention, FIGURE 3 is a detailed schematic drawing of the command signal limiter portion of my invention, FIGURE 4 is a graph showing the characteristic curves of the nonlinear amplifiers used in my disengage limiter circuit, and FIGURE 5 is a graph showing the input and output signals of the diode limiter circuit used in my command signal limiter circuit.

In FIGURE 1, I have shown a block diagram of my integrated limiter system in combination with a conventional autopilot, in order that the operation of my limiter, and its relationship to the autopilot, will be more clearly understood. Items 10, 11, 13, 14, and 15 are conventional autopilot components. Signals from an autopilot such as 10 are conventionally used to drive one or two amplifiers such as 11 and 13, and the resultant amplified signal operates a servo actautor such as 14 to drive the pitch attitude control surface such as stabilator 15, thereby controlling movement of aircraft 16. Aircraft movements and attitudes are detected by appropriate sensors (not shown), normally mounted in the aircraft and forming a part of the craft autopilot, such as autopilot 10, to thereby form a closed-loop servo-control system.

My integrated limiter circuit, which comprises the remaining portion of FIGURE 1, does not cause any basic change in autopilot operation. A diode limiter 12 is interposed between amplifiers 11 and 13, and this limiter operates to prevent the signal input to amplifier 13 from exceeding the predetermined limits fixed by signals received over leads 92 and 97. These limit signals are, in part, based on the operation of signal deivces 21, 31, 41 and 47, which are securely attached to the airplane and sense movements thereof. Disengage device 69 operates to disengage autopilot 10, and thereby limit the human pilot to manual control of aircraft 16, whenever comparator 67 detects a predetermined difference between the signals received from summing points 62 and 65, or whenever either of these signals exceeds limits that are preset in comparator 67.

More particularly, autopilot 10 supplies a control signal to amplifier 11, and this amplified signal is combined at diode limiter 12 with the acceleration limit signals received over leads 92 and 97. The output of diode limiter 12 operates discriminator amplifier 13, and this amplified signal operates servo actuator 14. The output of servo actuator 14 drives stabilator 15 to control aircraft 16 in its pitch axis. Movement of aircraft 16, in addition to controlling autopilot 10, causes the sensing devices associated with my limiter system, including angle of attack senser 21, rate gyroscope 31, and accelerometers 41 and 47, all of which are securely attached to the aircraft, to generate signals corresponding to said movement.

A signal developed in angle of attack sensor 21 is transmitted over lead 22 to summing point 70, and a signal from rate gyroscope 31 is transmitted over lead 32 to summing point 70. Mach scheduling device 72 is also effective to control the potential at summing point 70, by means of lead 73, and therefore the algebraic sum of signals on leads 22, 32, and 73 is transmited over lead 71 to control-circuit 80, which will be described in greater detail below.

Forward accelerometer 47 is arranged to drive a number of accelerometer potentiometers through connection 48, shown schematically as potentiometers 49, 51, and 53; and aft accelerometer 41 is arranged to drive accelerometer potentiometers 43 and 45 through connection 42. Although these are linear accelerometers, arranged to detect vertical, or pitch accelerations of the craft, their spaced-apart relation in the forward and aft ends of the craft makes it possible to develop a linear vertical acceleration term, and an angular acceleration term about a lateral axis through the craft center of gravity, in the well known manner.

In addition to driving stabilator 15, servo actuator 14 controls stabilator position potentiometers 56 and 58, by means 55. The output signal of stabilator position potentiometer 56 is transmitted over connection 57 to summing point 60, where it is combined with the output signals of accelerometer potentiometers 43 and 49. It should be noted that the output signal from forward accelerometer potentiometer 49 is transmitted over lead 50 and added at summing point 60; whereas the output signal from aft accelerometer potentiometer 43 is transmitted over lead 44 and subtracted at point 60. This arrangement causes the forward and aft linear accelerations terms to cancel, leaving only an angular acceleration term to be summed with the stabilator position signal. The resultant signal is then transmitted over lead 61 to summing points 62 and 85. The signal from forward accelerometer potentiometer 49 is then summed with said resultant signal at summing point 62, so that the signal transmitted to comparator circuit 67 contains both linear and angular acceleration terms, together with the stabilator position term. This arrangement makes it possible to operate the disengage device 69 responsive to both linear and angular accelerations, while preventing a linear acceleration signal from appearing in the command signal limiter bridge during angle of attack limiting. This will be explained in greater detail below.

Summing point 65 is controlled by the signals from stabilator position potentiometer 58, aft acceleration potentiometer 45, and forward acceleration potentiometer 51, so as to normally transmit a signal to comparator 67 that has a predetermined relationship to the signal from summing point 62. Comparator circuit 67 compares the signals received from summing points 62 and 65, and if said predetermined relationship between said signals does not exist, comparator circuit 67 transmits a disengage signal over connection 68 to disengage device 69. Disengage device 69 then operates to disengage autopilot 10, thereby preventing further automatic control of the aircraft.

The signal transmitted out of summing point 60 over connection 61, and which controls the comparator circuit through summing point 62 in the manner described above, is also transmitted to summing point 85 in the command signal limiter circuit. The signal received over connection 61 at summing point 85 is combined with a signal received over connection 84 from summing point 77. Although I have shown 77 as a summing point, there is no actual summation of signals at this point. Summing point 77 receives a signal from either connection 76 or connection 83, but not from both. The signal over connection 76 is received when acccelerometer potentiometer 53 provides a negative acceleration signal over connection 54 to circuit 75, which passes a negative signal only. In such a case, there is no signal received over connection 83 since circuit 82 is designed to pass positive signals only.

In the event that accelerometer potentiometer 53 provides a positive output signal over connection 54, in which case there will be no signal at connection 76 due to the operation of circuit 75, the positive signal at connection 54 is transmitted to circuit 80 which selects the larger of the positive signals received over connections 54 and 71. The signal selected by circuit 80 is then transmitted by means of connection 81 to circuit 82, which passes only the positive signals as mentioned above, and this positive signal is then transmitted by means of connection 83 to summing point 77, and then over connection 84 to summing point 85 where it is combined with the signal from lead 60.

The composite signal from summing point 85 is transmitted over connection 86 to limiter amplifier 87, and then over connection 88 to summing points 90 and 95. The output of limiter amplifier 87 is combined at summing point 90 with the positive normal acceleration limit signal received over connection 91, to provide a positive limit signal at connection 92; and is also combined at summing point 95 with the negative normal acceleration limit signal received over connection 96 to provide a negative limit signal at connection 97. Diode limiter 12 is arranged to prevent the command signal received from autopilot 10 and amplifier 11 from becoming more positive than the signal on connection 92, and to prevent this command signal from becoming more negative than the signal on connection 97. This function is described in detail below in connection with FIGURE 3, and circuit 283 therein.

In this limiter circuit, I have used the output from signaling devices 56, 43 and 49 to control both the command signal limiter circuit and the disengage limiter circuit. Thus, so long as the command signal limiter is working properly in the normal flight range of aircraft 16, the limit signal at connections 92 and 97 will prevent the aircraft from exceeding its structural limits, and thereby prevent the signal at connection 68 from operating disengage device 69. This dual use of signal devices 56, 43, and 49 is thereby effective to prevent nuisance disengagements of the autopilot during proper operation of the command signal limiter.

*Disengage Limiter*

FIGURE 2 is a detailed schematic of the above described disengage portion of my integrated limiter system. Where appropriate, I have used the identification numbers of FIGURE 1 to identify the corresponding components shown in FIGURE 2. It will be noted that the FIGURE 1 comparator 67 and disengaged device 69 are not specifically designated in FIGURE 2. However, circuits 186 and 197 supply the comparator function, and the relays and engage circuit thereby controlled supply the disengage function. In general, this disengage portion consists of two D.C. bridge circuits 101 and 120, two nonlinear amplifiers 123 and 160, two comparator amplifiers 186 and 197, and an autopilot engage circuit. The two bridge circuits ordinarily supply equal output signals to the connected non-linear amplifiers, these output signals being based on craft acceleration and stabilator position. Amplifiers 123 and 160 are thereby caused to supply equal output signals to the connected comparator amplifiers. So long as these signals remain equal, they cancel one another in the opposed input windings of the comparator amplifiers, and the output relays such as 192 remain in their normally energized condition to thereby maintain autopilot engage circuit. When the non-linear amplifier output signals become unequal by a predetermined amount, due to component failure or excessive bridge output signals, each of the comparator amplifiers operates to deenergize one of its output relays to thereby disengage the autopilot.

*Detailed Operation*

D.C. power supply 100 is used to supply the parallel connected potentiometers of D.C. bridge circuits 101 and 120, resistors of each potentiometer being connected in parallel across leads 102. D.C. bridge 101 consists of a potentiometer 43, driven by connection 42 responsive to operation of aft accelerometer 41; a potentiometer 56, driven by servo actuator 14 through connection 55; and a potentiometer 49, driven by forward accelerometer 47 through connection 48. D.C. bridge 120 consists of a potentiometer 45, driven by aft accelerometer 41 through connection 42; a potentiometer 58, driven by connection 55 responsive to operation of servo actuator 14; and a potentiometer 51, driven by forward accelerometer 47 through connection 48. As mentioned above, accelerometers 41 and 47 are spaced-apart linear accelerometers used to obtain both linear and angular accelerations, as is well known in the art.

Potentiometer 49 consists of a resistor 103 and a wiper 104, wiper 104 being normally positioned at the center or no voltage position of resistor 103. An acceleration of the craft causes wiper 104 to be displaced with respect to resistor 103, thereby causing wiper 104 to receive either a positive or negative voltage from D.C. supply 100 depending upon the direction of acceleration. The potential at wiper 104 is transmitted through summing resistor 105 to summing point 62, and through lead 106 to the command signal limiter bridge shown in FIGURE 3 as will be explained in greater detail below. Potentiometer 56 includes resistor 107 and wiper 108, wiper 108 being normally located at the center or no voltage position on resistor 107. When servo actuator 14 operates to drive stabilator 15 (see FIGURE 1), it also drives mechanical linkage 55 to move wiper 108 with respect to resistor 107, thereby causing wiper 108 to pick off a negative or positive voltage depending upon the direction of movement of wiper 108. This voltage is transmitted through capacitor 109 and summing resistor 110 to summing point 62, and through lead 111 to the command signal limiter bridge. Capacitor 109 causes the servo actuator signal from potentiometer 56 to be hi-passed, since any steady state signal is blocked. Potentiometer 43 includes resistor 112 and wiper 113, wiper 113 being normally positioned at the center or no voltage position of resistor 112. An acceleration of the craft causes wiper 113 to be displaced with respect to resistor 112, thereby causing wiper 113 to receive either a positive or negative voltage from D.C. supply 100 depending upon the direction of acceleration. The potential at wiper 113 is transmitted through summing resistor 114 to summing point 62, and through lead 106 to the CSL bridge. The signals received at summing point 62 from potentiometers 43, 49 and 56 are thereby transmitted to control winding 124 of non-linear amplifier 123. This magnetic amplifier will be discussed in greater detail below.

Bridge circuit 120 is identical to bridge circuit 101, and normally provides a signal at summing point 65 that is equal to the signal at summing point 62. This is caused by the fact that summing resistors 115, 117 and 118 are identical to summing resistors 114, 110 and 105, respectively. Capacitor 116 in bridge circuit 120 serves the same function as capacitor 109 in bridge circuit 101. It should be noted here that resistors 105 and 118 have a smaller ohmic value than resistors 114 and 115. This causes the signal from the forward accelerometer potentiometers to provide a larger signal at the summing points than the aft accelerometer potentiometers, preventing the linear acceleration term from being cancelled. Thus, the signal at summing points 62 and 65 contains angular and linear acceleration terms, in addition to the stabilator position term.

A number of magnetic amplifiers are used in my integrated limiter system, including non-linear amplifiers 123 and 160 in FIGURE 2, comparator amplifiers 186 and 197 in FIGURE 2, angle of attack preamplifier 230 in FIGURE 3, and command signal limiter amplifier 270 in FIGURE 3. In each of these amplifiers, the saturable reactors are arranged in a push-pull configuration, and the amplifiers are therefore quite similar in operation. I will therefore provide a detailed explanation of amplifier 123, and merely refer back to this explanation when discussing the other amplifiers in the system, thereby avoiding a lengthy explanation of each amplifier.

In magnetic amplifier 123, I have shown a control winding 124, parallel connected non-linear windings 125 and 126, parallel connected bias windings 127 and 128, and load winding bridge 140 comprising load windings 142, 143, 146 and 147. Although I have, for simplicity, shown the control, non-linear and bias windings to be single units, each of these windings actually consists of four series connected winding-sections. Four saturable-reactor cores are provided (not shown), with one load winding wound on each core, and one of said sections from each of said windings 124 to 128 wound on one of said cores so as to control one of said load windings. For example, one section of winding 124, a section of 125, a section of 126, a section of 127, and a section of 128 are wound on a core so as to control the saturation of the core and thereby control the impedance of winding 142 of bridge 140.

A power supply transformer consisting of primary winding 153 and center tapped secondary winding 154 supplies the A.C. voltage for operating the load windings of load winding bridge 140. These load windings, since connected in push-pull relationship, provide a zero output from the magnetic amplifier when there is no signal impressed on control winding 124. This is illustrated in FIGURE 4, and more specifically, in curve 303, which is the input-output characteristic of amplifier 123. Under conditions of no signal input, and assuming that the right end of secondary winding 154 is positive, current is carried by diode 144, load winding 143, resistor 156, and resistor 155 over a circuit including the right half of secondary winding 154; and current is also carried by diode 145, load winding 146, resistor 157, and resistor 155 over a second circuit including the right half of secondary winding 154. The voltage drop across resistors 156 is equal and opposite to that across resistor 157, and therefore the output of the magnetic amplifier, measured between point 180 and ground, is zero. On the opposite half cycle of the A.C. supply voltage received at primary winding 153, the left end of secondary winding 154 becomes positive, causing current to be carried by diode 141 and load winding 142, with a second path including diode 148 and load winding 147. Thus, the load windings of this magnetic amplifier are arranged in a full-wave rectifier configuration, and the direction of current flow through resistors 155, 156 and 157 is always the same.

It should be noted that bias windings 127 and 128 are connected in parallel across resistor 155, so that the D.C. voltage drop across resistor 155 provides a source of voltage for controlling these bias windings. This self-bias arrangement greatly increases the stability of the overall unit as far as A.C. input voltage variations are concerned, and also improves the linearity of the input-output characteristic of the magnetic amplifier. Potentiometer 150, consisting of resistor 151 and wiper 152, provides a manual adjustment for this bias arrangement to compensate for non-linearities in the various components.

When an input signal is impressed on control winding 124 from summing point 62, the saturation of the saturable-reactor core units associated with windings 142 and 143 is, for example, increased, while the saturation of the saturable-reactor core units associated with load windings 146 and 147 is decreased. When the polarity of the input signal is reversed, these saturation changes are also reversed. Since an increase in saturation causes a decrease in impedance of the load winding, and conversely since a decrease in saturation causes an increase in the load winding impedance, an input signal at load winding 124 is effective to cause a difference between the potential drops across resistors 156 and 157, and this difference in potential drop provides the output signal of magnetic amplifier 123. For example, assuming that a positive signal is received at control winding 124 from summing point 62, and that the impedance of windings 142 and 143 is thereby decreased (increase in magnetic saturation) while the impedance of windings 146 and 147 is increased (decrease in magnetic saturation), then the voltage drop across resistor 156 increases while the voltage drop across resistor 157 decreases. This results in a positive signal at point 180, this positive signal being the output of magnetic amplifier 123. Converely, if a negative input signal is impressed on control winding 124, a negative output signal is impressed on output lead 181 from point 180.

The characteristic curve 303 in FIGURE 4 indicates the relationship between input and output signals. It should be noted that as the input signal goes negative from zero to 306, the output signal also goes negative from zero to 304; and that a positive input between zero and 307 causes a positive output between zero and 305. Since amplifier 160 is identical to amplifier 123, and since they receive equal input signals during the normal operation of the system, the characteristic curve 312 of amplifier 160 is identical to curve 303 for inputs ranging from 313 to 314.

For a more detailed analysis of these magnetic amplifiers, reference is made to H. F. Storm's book entitled Magnetic Amplifiers, copyright 1955, wherein these amplifiers are referred to as push-pull center-tap amplistats.

In the above discussion, no reference has been made to the non-linear portions of curves 303 and 312, and no explanation has been provided as to the operation of non-linear windings 125, 126, 162 and 163. This characteristic-curve non-linearity is caused by said non-linear windings, and the operation thereof will now be described.

It is seen above, that an input signal received at control winding 124 from D.C. bridge 101, and ranging in magnitude between points 306 and 307 on FIGURE 4, causes a corresponding linear output at point 180 ranging in value between points 304 and 305 of FIGURE 4. In like manner, the D.C. output voltage from bridge 120 and summing point 65, is connected to the control winding of magnetic amplifier 160, and this signal input to magnetic amplifier 160 is equal to the input to magnetic amplifier 123. Thus, an input at magnetic amplifier 160 falling in the range between points 313 and 314 of FIGURE 4, would cause an output ranging between points 304 and 305. In this normal range of signals, windings 125 and 126 carry equal currents, based on the difference of potential between output point 180 and wiper 175 of power supply 170; while windings 162 and 163 carry equal currents based on the difference of potential between point 182 and wiper 173. Winding 125 is wound in magnetically-opposed relation to winding 126, and winding 162 in opposed relation to winding 163, and therefore, these windings have no effect on the operation of amplifiers 123 and 160 in said normal range of signals.

However, when the positive input at control winding 124 of magnetic amplifier 123 reaches point 307 indicated on curve 303, the output reaches point 305, and this output becomes sufficiently positive to cut off conduction through winding 126 due to the operation of diode 138. Non-linear winding 125 is thereafter effective to control the saturation of the saturable core material, since the opposing or counteracting effect of winding 126 is terminated. This causes the amplifier to become unstable, and, as indicated on idealized curve 303, there is a sudden positive increase in output voltage to point 308.

It will be noted in FIGURE 4 that the non-linear portion of the curve 303 is in the first quadrant of the graph, and that the non-linear portion of curve 312 is in the third quadrant of the graph. This is caused by the polarization of diodes 138 and 161. Diode 138 is connected, by means of wiper 175, to a positive point on resistor 174, and conduction of diode 138 is therefore not affected by a negative potential at point 180, whereas a positive output potential greater than indicated at point 305 causes diode 138 to be cut off. Diode 161, on the other hand, is connected by means of wiper 173 to a negative point on resistor 172, and therefore a positive potential at point 182 has no effect on the conduction of diode 161, whereas a negative output potential greater than that of point 304 on the graph causes diode 161 to be cut off. Furthermore, windings 162 and 163 are also wound in opposite directions as compared to windings 125 and 126, so as to cause a negative going pulse on curve 312 when the unstable region of magnetic amplifier 160 is reached, rather than the positive going pulse of curve 303.

In view of the operation of magnetic amplifiers 123 and 160, as described above, it is seen that the potential at points 180 and 182 is equal while the amplifiers are operating along the linear portion of their characteristic curves. However, when an excessive positive signal is received from bridge circuits 101 and 120, point 180 becomes more positive than point 182, and, conversely, when an excessive negative signal is received, point 182 becomes more negative than point 180. This difference in output potential is detected by comparator amplifiers 186 and 197, and these amplifiers then operate to disengage the autopilot in the manner to be described below.

The various capacitors and resistors connected at the ends of the non-linear windings 125 and 126 function as follows: Resistor 130 is connected between output point 180 and input point 62, and controls the overall negative feedback of the amplifier. Capacitor 131 is a small filter to prevent disengagements of the autopilot due to noise inputs such as are caused by rough air, etc. Resistors 132 and 137 provide an impedance in series with the winding 125 that is equal to the impedance of resistors 133 and 136. Resistors 132 and 137 are selected to cause the desired snap action of the amplifier with a minimum hysteresis loop (shown ideally in FIGURE 4 as a vertical line above point 307); and resistors 133 and 136 cancel positive feedback. Capacitors 134 and 135 are A.C. filters, to prevent any interference with the snap action provided by diode 138. The equivalent components connected to windings 162 and 163 of amplifier 160 are identical to the amplifier 123 components.

It should be noted that power supply 170, which consists of two potentiometers connected in series between negative pole 171 and positive pole 176, provides a convenient means for adjusting the linear range of amplifiers 123 and 160. Adjustment of wiper 175 along resistor 174 causes a change in the cut-off point of diode 138; and adjustment if wiper 173 along resistor 172 causes a change in the cut-off point of diode 161.

Amplifiers 186 and 197 are arranged to detect a predetermined difference of potential between points 180 and 182. These amplifiers are identical in structure and operation, and one would suffice to control the disengage function of my integrated limiter system. However, two amplifiers are preferably used to improve the fail-safety of the system. Each of these amplifiers has two control windings, such as windings 195 and 196 in magnetic amplifier 186. Winding 195 receives an input signal from point 180 of magnetic amplifier 123 by way of lead 181 and resistor 184, and winding 196 receives an input signal from point 182 of magnetic amplifier 160 by way of lead 183 and resistor 185. Since the potential at point 180 is normally equal to the potential of point 182, and since windings 195 and 196 are wound on the magnetic core (not shown) of magnetic amplifier 186 so as to have opposing effects on the magnetic saturation thereof, these windings 195 and 196 normally have no effect on the operation of the amplifier.

Bridge circuit 188 of magnetic amplifier 186 is very similar to bridge 140 of amplifier 123, and consists of four equally rated saturable reactor cores with A.C. load windings such as 189 and 191. Each of these windings is caused to carry current in only one direction by diodes such as 190. As in the case of amplifiers 123 and 160, control windings 195 and 196 are each made up of four winding sections, one section of each winding being arranged to control one of the load windings. The power supply transformer, consisting of primary winding 153 and center tapped secondary winding 187, provides the supply voltage for operating output relays such as 192, to thereby maintain contacts such as 193 closed during normal operating conditions. The saturable-reactor cores of bridge 188 are arranged to be highly saturated under no signal conditions, and therefore present a minimum impedance to the flow of current. Thus, the output relays such as 192 are normally energized (shown deenergized), with capacitors such as 198 filtering the pulsations out of the rectified alternating current. Therefore, under normal operating conditions, magnetic amplifiers 186 and 197 operate to maintain their respective output relays energized, thereby completing the series engage circuit, including contact 193, for aircraft autopilot 10.

When there is a difference of potential between points 180 and 182, caused either by a malfunction of one of the devices in either bridge 101 or 120, or by an excessive positive or negative signal that drives either amplifier 123 or 160 into its non-linear region of operation, control windings such as 195 and 196 of magnetic amplifier 186 no longer have equal and opposite effects on the saturation of the saturable-reactor cores associated with bridge 188. This difference of input at control windings 195 and 196 causes two of said cores to become more saturated, while causing the other two to become less saturated. The windings associated with the saturable-reactor units that become less saturated present a greater impedance to the flow of current, thereby reducing the amount of voltage available to operate the connected output relay and causing it to become de-energized. De-energization of one of the relays opens a contact such as 193 in the autopilot engage circuit, and autopilot 10 thereby becomes disengaged. For example, if we assume that point 180 is more positive than point 182, control winding 195 would have a greater effect on the magnetic saturation of the reactor units of bridge 188 than control winding 196, and if we further assume that the sections of winding 195 are arranged so that this positive control signal causes a decrease in the saturation of the saturable-reactor core associated with load winding 189, while increasing the saturation of the core associated with winding 191, then the impedance of load winding 189 would increase while the impedance of load winding 191 would decrease. The increase in impedance across load winding 189 causes less of the available voltage at secondary winding 187 to be dropped across relay 192, and more of this voltage to be dropped across load winding 189, thereby causing relay 192 to become de-energized. Since load winding 191 decreases in impedance, the connected output relay would continue to be energized. However, since contact 193 is opened when relay 192 is de-energized, the series engaging circuit for autopilot 10 is opened, and the autopilot is thereby disengaged. It should be noted that this greater positive signal at point 180 would also cause one of the relays of magnetic amplifier 197 to be de-energized, and therefore there would be two open contacts in the engage circuit.

*Command Signal Limiter*

In order to simplify an explanation of my command signal limiter, I will first describe the general operation of the circuit as shown in FIGURE 3. This command signal limiter includes a D.C. bridge circuit 206, comprising a device for generating acceleration signals including accelerometer 47, a device for generating rate signals including pitch rate gyroscope 31, and a device for generating angle of attack signals including angle of attack sensor 21. This D.C. bridge 206 also includes an angle of attack preamplifier 230, a diode control circuit 252, and a Mach scheduling device 225.

It should be noted that some of the reference numbers of the FIGURE 1 block diagram have been repeated here where the same components are involved. However, many of the numbers are not repeated, since there is no direct structural identity. On the other hand, there is an identity of function, whereby point 70 is comparable to point 216, device 72 to device 225, blocks 80 and 82 to diodes 253 and 254, point 77 to the junction of resistors 256 and 257, block 75 to diode 255, point 85 to point 205, amplifier 87 to amplifier 270, point 90 to point $E_1$, point 95 to point $E_2$, and block 12 to diodes 287 and 289, as will become apparent in the detailed operation below.

Bridge 206 is arranged to transmit a signal, by way of lead 258, to summing point 205, at which point the signal is combined with an acceleration signal received over lead 106 and summing resistor 202 from forward accelerometer potentiometer 49, a stabilator position signal received over lead 111 and summing resistor 203, and an acceleration signal received over lead 115 and summing resistor 204 from aft acceleration potentiometer 43. Capacitor 217 causes the stabilator position signal to be high-passed, thereby serving the same function as capacitors 109 and 116 (see FIG. 2). The signal transmitted from bridge 206 to summing point 205 corresponds to the signal from accelerometer 47 when the aircraft is accelerating in a negative direction, and corresponds to the greater of the accelerometer 47 or angle of attack 21 signals when the aircraft is accelerating in a positive direction. Diode circuit 252 is arranged to determine which of these signals should be transmitted to the summing point. The angle of attack preamplifier 230 is involved in determining which of the angle of attack or acceleration signals is greatest, and will be explained in more detail below. The Mach scheduling device is connected to summing point 216, and is effective to control the voltage at point 216 and thereby vary the effect of the composite pitch rate and angle of attack signal transmitted to summing point 216 from bridge 206.

The composite signal received at summing point 205 is amplified by command signal limiter amplifier 270, filtered in filter circuit 280, and then transmitted by means of circuit 281 to modulator 282. Filter circuit 280 is of conventional design, and explanation is not considered to be necessary. Modulator 282 is also of conventional design, and is effective to combine the varying signal received over lead 281 with an A.C. signal impressed on the primary winding 237. The combined signal is then transmitted by means of center tapped primary winding 284 of transformer 291 to diode limiter circuit 283.

Diode limiter circuit 283 operates to establish positive and negative limit signals, by means of the positive and negative voltages impressed on leads 268 and 269 respectively, in combination with the A.C. signal received from the primary winding 284 of transformer 291. These positive and negative limits, are clamped to autopilot command signal lead 292 by means of conductor 293 and D.C. blocking condenser 298. The signals received over autopilot command signal lead 292 are prevented from exceeding the limits established by diode limiter circuit 283 due to the shunting action provided by lead 293 and condenser 298. A signal on lead 292 is thereby limited before being transmitted to servo amplifier 294, the amplified signal being then effective to operate servo actuator 295, which in turn operates mechanical linkage 296 to control the stabilator through means 297.

*Detailed Operation*

As mentioned above, bridge 206 includes three signal generators, one for acceleration signals, another for rate signals, and another for signals corresponding to aircraft angle of attack. Each of these signal generators includes a potentiometer, with the resistor of each potentiometer connected in parallel across D.C. power supply 200 by means of leads 201. When an acceleration signal is detected by accelerometer 47, connection 48 moves wiper 208 of potentiometer 53. Wiper 208 is normally located at the center or null position of resistor 207. However, when accelerometer 47 is moved responsive to accelerating aircraft movement, connection 48 moves wiper 208 with respect to resistor 207, thereby causing a voltage to be connected from wiper 208 through summing resistor 209, and then to the junction of diodes 253 and 255 of diode control circuit 252. The arrow located between wiper 208 and resistor 209 indicates the direction of movement for a positive acceleration condition, thereby indicating that a negative voltage would be impressed on summing resistor 209 under conditions of positive acceleration.

Gyroscope 31 detects pitch rate movements of the aircraft, and operates connection 213 to move wiper 212 when a pitch rate movement is detected. Movement of wiper 212 with respect to resistor 211, causes a voltage from power supply 200 to be picked off by wiper 212 and transmitted through condenser 214 to summing resistor 215, and then to summing point 216. This circuit operates to provide pitch damping for the aircraft, and condenser 214 causes the circuit to damp only transient rate signals and not steady state rate signals.

Angle of attack sensor 21 operates actuator 223 in response to the aircraft angle of attack, thereby moving wiper 222 of potentiometer 220 with respect to the potentiometer resistor 221. Movement of wiper 222 causes a signal to be picked off of resistor 221, from power supply 200, and this voltage is impressed across summing resistor 254 to summing point 216.

The composite signal at summing point 216, which includes a pitch rate and angle of attack information, is impressed on control winding 231 of angle of attack preamplifier 230. Magnetic amplifier 230 includes, in addition to control winding 231, self-bias windings 232 and 233, and load winding bridge 240 including load windings 241, 243, and 244. Thus, this amplifier is identical in its basic operation to amplifier 123 shown in FIGURE 2 and discussed in detail above.

The circuit of amplifier 230 is arranged so that a positive angle of attack signal, which is indicated to be a positive voltage by the arrow between wiper 222 and resistor 224, causes a positive potential at summing point 216, and a negative voltage across amplifier output resistors 249 and 250. This negative output voltage is connected through diode 254 and resistor 251 to control winding 231, thereby providing an inverse feedback signal. Angle of attack preamplifier 230, which is effectively connected between summing point 216 and diode 254, is designed to reduce the threshold voltage of diode 254 by a factor of the amplifier gain.

Diodes 253 and 254 corespond to block 80 in FIGURE 1, since these diodes operate to select the greater positive of the angle of attack or acceleration signals. It should be noted that a positive acceleration of the aircraft causes a negative signal to be impressed upon summing resistor 209, and that a positive angle of attack signal causes a negative potential at the output of magnetic amplifier 230, thereby necessitating the indicated orientation of diodes 253 and 254. If the negative acceleration signal exceeds the angle of attack negative feedback signal, diode 253 conducts and diode 254 is cut off, and vice versa, so that only one of these signals is impressed upon summing resistor 257 and thereby transmitted over lead 258 to summing point 205.

In the event that a negative aircraft acceleration condition occurs, resulting in a positive signal impressed across resistor 209, diode 255 conducts and this voltage is impressed across summing resistor 256 and over lead 258 to summing point 205.

As mentioned above, acceleration signals are transmitted from bridge 101 of FIGURE 2 by way of leads 106 and 115 to summing resistors 202 and 204, respectively, and from there to summing point 205; and a stabilator position signal is transmitted from bridge 101 in FIGURE 2 by way of lead 111 to summing resistor 203 and from there to summing point 205. Thus, the signals from leads 258, 107 and 113 are combined at summing point 205, and this composite signal is the input signal for control winding 271 of magnetic amplifier 270. It should be noted here that resistors 202 and 204 have equal ohmic values, thereby causing the linear acceleration terms to cancel. Thus, the signals transmitted from FIGURE 2 over leads 106, 111 and 115 supply angular acceleration and stabilator position terms to summing point 205, but no linear acceleration term.

Magnetic amplifier 270 is identical in operation to magnetic amplifier 123 described above, except for the provision of a conventional filter circuit 280 in the output circuit. Thus, it is considered necessary to point out merely that an input signal at lead 271 causes a filtered D.C. signal in output circuit 281. This output signal is transmitted over lead 281 to modulator circuit 282.

Modulator 282 operates to combine the varying D.C. output signal from magnetic amplifier 270 and the A.C. voltage impressed on the modulator from primary winding 237. The center tapped output winding 284 of modulator 282, which is the primary winding of transformer 291, receives said varying D.C. voltage from lead 281 modulated by the A.C. voltage of primary winding 237. This resultant signal is then effective to provide positive and negative limit signals in diode limiter circuit 283.

Diode limiter 283 will be best understood by reference to FIGURE 5, which is a graph showing how the various signals are combined and limited by the circuit of FIGURE 3. The limiting action of diode limiter 283 is achieved by combining D.C. signals from D.C. power supply 260 with the A.C. limit signal received from transformer 291, and by preventing the autopilot command signal received on lead 292 from becoming either more positive or more negative than the established limit signal. In order to explain this operation, the D.C. potential picked off of power supply 260 by potentiometer wiper 264 and transmitted to the diode limiter over lead 268 will be referred to as $E_1$; the D.C. potential picked off of power supply 260 by potentiometer wiper 262 and transmitted to the diode limiter over lead 269 will be referred to as $E_2$; the voltage impressed on secondary windings 285 and 286 of transformer 291, which is the A.C. limit signal received from the command signal limiter, will be referred to as $E_L$; and the input command signal on lead 292 will be referred to as $E_S$.

Since resistors 288 and 290 are equal in size, it can be shown that the potential at point 299 of diode limiter 283, caused by the D.C. potentials $E_1$ and $E_2$, is equal to the quantity $$\frac{E_1+E_2}{2}$$

This would be signal ground potential only if $E_1$ and $E_2$ are equal and opposite, and this is unlikely to occur, since it is usually desirable to provide a higher positive acceleration limit than a negative acceleration limit. Therefore, point 299 is ordinarily biased at a potential above signal ground. Using a specific example, if we assume that $E_1$ is +4 volts, and $E_2$ is a −2 volts, indicating that the positive acceleration limit set by wiper 264 is twice the negative acceleration limit set by wiper 262, the potential at point 299 is +1 volt as emphasized in FIGURE 5 by line 404.

Since the signal voltage $E_S$ is connected to the diode limiter at point 299, and since condenser 298 is merely a D.C. blocking condenser, it follows that diode 287 will not conduct until the A.C. voltage $E_S$ causes a potential at point 299 that negatively exceeds the D.C. potential $E_2$, and that diode 289 will only conduct when the potential at point 299 positively exceeds $E_1$. Thus, it will be noted that diode 289 conducts when the potential of point 299 exceeds four volts, and diode 287 conducts when the potential of point 299 exceeds two volts. This occurs when the A.C. signal $E_S$ has a greater excursion, or swing, than ±3 volts, whereupon the A.C. signal superimposed on the D.C. bias at point 299 causes the potential at point 299 to become more positive than +4 volts and more negative than −2 volts. Diode 287 or 289 then conducts and shunts to ground the portion of $E_S$ that drives point 299 beyond the +4 or −2 volt bias voltage. The total swing of $E_S$ is thereby limited by said bias voltages. This relationship is shown in FIGURE 5, where line 402 indicates the D.C. conduction level for diode 289, line 403 indicates the D.C. conduction level for diode 287, and line 404 indicates the bias potential at point 299 and the center line upon which $E_S$ is superimposed (not shown).

The D.C. circuitry just described is, of course, unable to provide the desired different positive and negative acceleration limits, since the $E_S$ command is merely limited, in either phase, to a voltage swing corresponding to the average of said $E_1$ and $E_2$ bias voltages, which is ±3 volts in our example. However, a feedback circuit including resistors 265 and 266 operates to achieve the desired difference. The feedback network causes a bias on the command signal limiter amplifier input that is equivalent to the bias maintained at point 299. Summing resistors 265 and 266 are connected to lead 258 and summing point 205 as shown. Resistors 265 and 266 are chosen so as to cause a direct current to be produced in winding 271 of amplifier 270 that produces an A.C. bias signal in windings 285 and 286 equivalent to the bias at point 299. This A.C. bias signal, which has a total swing of ±1 volt in my example, when superimposed on the D.C. bias signals $E_1$ and $E_2$, causes $E_1$ to vary as shown in curve $E_{L1}$, and causes $E_2$ to vary as shown in curve $E_{L2}$ when the craft is in level flight.

A command signal $E_S$, in phase with said A.C. bias signal, is then limited to curve $E_{S1}$; and an out of phase command signal is limited to curve $E_{S2}$. Since the in-phase command signal corresponds to a positive acceleration, or nose up command, the positive acceleration limit is four volts since it requires a +4 volt $E_S$ command during the first half cycle of the signal, when added to the fixed 1 volt bias, to overcome the 5 volt bias at point $E_1$, and a −4 volt $E_S$ command during the second half cycle to overcome the −3 volt bias at point $E_2$. Furthermore, since the out-of-phase command signal corresponds to a negative acceleration, or nose down command, it is similarly apparent that the negative acceleration limit is two volts. The desired difference between positive and negative acceleration limits is thereby established. This feedback arrangement, coupled with the D.C. bias arrangement in circuit 283, makes it possible to select a wide variety of positive and negative acceleration limit combinations, merely by adjusting the two potentiometers 261, 262, 263 and 264.

The above discussion has been based on the presumption that the aircraft was in level flight, whereby there was no output signal from CSL bridge circuits 101 and 206. However, when such a signal does exist, it is summed at point 205 with the feedback signal from resistors 265 and 266, and superimposed on the above described limit signals $E_{L1}$ and $E_{L2}$. When the aircraft is subject to positive acceleration, CSL bridge circuits 101 and 206 supply a resultant signal that is out-of-phase with said A.C. bias signal. On the other hand, negative acceleration causes a bridge signal that is in-phase with the A.C. bias signal. It should be kept in mind that although the signal from bridge circuits 101 and 206 is, for convenience, referred to as an acceleration signal, the actual signal may include angle of attack, stabilator position and pitch rate terms.

The effect of a CSL bridge signal is illustrated in FIGURE 5, in connection with a negative acceleration condition. The negative acceleration condition causes an output from bridges 101 and 206 that is in phase with $E_{L1}$ and $E_{L2}$, being thereby additive therewith. For example, the total ±1 volt swing of the limit voltage $E_{L1}$ (from +5 to +3 volts) may be changed to a ±2 volt swing as shown in curve $E_{L1}'$ (from +6 to +2 volts); and the ±1 volt swing of $E_{L2}$ correspondingly changed to a ±2 volt swing as shown in curve $E_{L2}'$. This change in $E_{L1}$ and $E_{L2}$ corresponds to the change in craft acceleration, and indicates in this particular example that the craft is accelerating in a downward direction at an acceleration approximately one half of the predetermined limit of two volts, and reduces the negative acceleration limit curve $E_{S2}$ to a swing of ±1 volt as indicated by curve $E_{S2}'$ (swing from zero to +2 volts). When the craft negative acceleration increases to the predetermined maximum, curve $E_{S2}'$ becomes colinear with line 404, and any additional negative acceleration command $E_S$ is then shunted to ground since diodes 287 and 289 are effectively short circuited.

In a similar manner, the positive acceleration limit of curve $E_{S1}$ is varied by the signals from bridges 101 and 206. When the craft moves from level flight to a condition of maximum positive acceleration, the out-of-phase bridge signals cause curves $E_{L1}$ and $E_{L2}$ to become reversed in phase, until peaks 405 and 408 become colinear with line 404, and peaks 406 and 407 reach −5 and +7 volts respectively. Curve $E_{S1}$ then becomes colinear with line 404, and any positive acceleration command $E_S$ is shunted to ground through diodes 287 and 289.

Thus, it is seen that diode limiter circuit 283 provides positive and negative limits for an A.C. command signal on lead 292, and thereby prevents the command signal from causing a flight maneuver that would exceed structural, stall or buffet limits of the aircraft. This limit signal varies as the signal at point 205 varies, since the peak-to-peak swing of $E_{L1}$ and $E_{L2}$ is thereby varied. The limited command signal is then transmitted to servo-amplifier 294, servo actuator 295, and by means of connection 296 to stabilator actuator 297 and thereby operates the stabilator of the aircraft.

It will be recalled from the above description of the disengage limit circuitry, that an excessive signal from bridge circuits 101 and 120 will cause the autopilot to be disengaged. However, this disengage operation is preferably arranged to occur at an acceleration condition somewhat in excess of the limit signals established in the command signal limiter. Thus, craft movements causing acceleration signals only slightly in excess of the limit set in FIGURE 3 will not cause nuisance disengagements of the autopilot. Furthermore, it should be noted that such excessive signals will actually tend to move the craft so as to reduce the craft acceleration. For example, if the negative acceleration signal of FIGURE 4 is increased until the negative and positive peaks of curves $E_{L1}'$ and $E_{L2}'$, respectively, cross line 404, signal $E_{S2}'$ would become reversed in phase, and place a voltage on diodes 287 and 289 tending to cause positive craft acceleration.

Mach scheduling is provided in this circuit, and is caused by varying the D.C. bias potential at point 216 so as to vary the effectiveness of the composite angle of attack and pitch rate signal. This is accomplished by connecting mach scheduler 225 to summing point 216 through summing resistor 226, whereby variations in mach cause mach scheduler 225 to vary the effectiveness of angle of attack sensor 21.

The connection between power supply 260 and summing point 216 of bridge 206, has the function of cancelling out the effect of normal acceleration when the angle of attack signal is the dominant signal transmitted over connection 258 to summing point 205. The D.C. normal acceleration limit signal, which is picked off at wiper 262 and transmitted to diode limiter 283 over lead 269, is cancelled through proper selection of components, by transmitting a portion of this acceleration limit signal through summing resistor 267, angle of attack preamplifier 230, command signal limiter amplifier 270, filter 280, modulator 282, and then into diode limiter 283 where it is deducted from the D.C. acceleration limit signal. Thus, the acceleration limit signal is cancelled out, and the angle of attack signal establishes the command signal limit. This arrangement makes it possible to vary the acceleration limit signal, by manually positioning wipers 262 and 264 with respect to their respective resistors 261 and 263, without affecting the angle of attack control, since the acceleration limit signal is automatically cancelled out when angle of attack signals are predominant.

What has been described is considered to be the preferred embodiment of my invention, but it should be understood that the invention is not necessarily limited to the structure shown, and various modifications and changes could be made without departing from the spirit and scope of the invention as indicated in the following claims.

I claim:

1. Control apparatus for a dirigible craft having a control surface for controlling attitude thereof about an axis of the craft, comprising: power means for positioning said control surface to alter craft attitude, a first signal providing means comprising a first source of variable magnitude control voltage normally effective to control said power means to thereby effect operation of said control surface; second signal providing means comprising a second source of variable magnitude control voltage; circuit means for limiting said first voltage in accordance with said second voltage; and monitoring means connected to said second signal providing means and arranged to terminate said first control voltage responsive to a predetermined condition of said second signal providing means.

2. Control apparatus for a dirigible craft having a control surface for controlling pitch attitude thereof, comprising: power means for positioning said control surface; first signal providing means comprising a first source of variable magnitude control voltage, normally effective to control said power means and thereby cause operation of said control surface; second signal providing means comprising a second source of variable magnitude control voltage; third signal providing means comprising a third source of variable magnitude control voltage; fourth signal providing means comprising a fourth source of variable magnitude control voltage; circuit means for limiting said first voltage in accordance with the algebraic sum of said second and third voltages; and monitoring means connected to said second and fourth signal providing means and arranged to terminate said first voltage responsive to a predetermined relationship between said second and fourth signals.

3. Control apparatus for a dirigible craft having a control surface for controlling craft attitude, comprising: power means for positioning said control surface; first signal providing means comprising a first source of variable magnitude control voltage connected continuously to said power means, normally effective to control said power means and thereby cause operation of said control surface; second signal providing means comprising a second source of variable magnitude control voltage; third signal providing means comprising a third source of variable magnitude control voltage; first circuit means connected to the first signal providing means for limiting the magnitude of said first voltage in accordance with said second voltage; further circuit means for comparing said second and third signals; and means in the first circuit means operated by said comparing means for terminating said first signal by said third signal responsive to a predetermined comparative difference between said second and third signals.

4. Control apparatus for a dirigible craft having a control surface for controlling pitch attitude thereof, comprising: power means for positioning said control surface; first signal providing means comprising a first source of variable magnitude control voltage, normally effective to control said power means and thereby cause operation of said control surface; second signal providing means comprising a second source of variable magnitude control voltage; third signal providing means comprising a third source of variable magnitude control voltage; circuit means for limiting said first voltage in accordance with said second voltage; first amplifying means having input and output circuits, said input circuit being connected to said second signal providing means so as to amplify said second control voltage; second amplifying means having input and output circuits, said input circuit of said second amplifying means being connected to said third signal providing means so as to amplify said third control voltage; circuit means connected to said output circuits for comparing said amplified second and third control voltages; and means operated by said comparing means for terminating said first control voltage responsive to a pre-determined relationship between said amplified second and third control voltages.

5. Control apparatus for a dirigible craft having a control surface for controlling pitch attitude thereof, comprising: power means for positioning said control surface servomotor; first signal providing means comprising a first source of variable magnitude control voltage, normally effective to control said power means and thereby affect operation of said control surface; second signal providing means comprising a second source of variable magnitude control voltage; circuit means for limiting said first voltage in accordance with said second voltage; a first amplifier having input and output circuits and connected by means of said input circuit to said second signal providing means so as to be driven by said second control voltage, said amplifier arranged to provide a signal in said output circuit having a substantially linear relationship to a varying input signal over a range of output voltages less than a pre-determined positive magnitude, and a non-linear relationship for output voltage of greater positive magnitude; third signal providing means comprising a third source of variable magnitude control voltage; a second amplifier having input and output circuits and having said input circuit connected to said third signal providing means so as to operate responsive to said third control voltage, said second amplifier arranged to provide a signal in said output circuit having a substantially linear relationship to a varying input signal over a range of output voltages less than a predetermined negative magnitude, and a non-linear relationship for output voltages of greater negative magnitude; comparing means connected to the output circuits of said first and second amplifiers; and means operated by said comparing means for terminating said first control voltage responsive to a predetermined relationship between said first and second control voltages, said predetermined relationship being caused to exist when either of said second or third signals is terminated and when one of said amplifiers operates in said non-linear range of voltages.

6. Control apparatus for a dirigible craft having a control surface for controlling pitch attitude thereof, as claimed in claim 5, wherein said amplifiers are of the saturable-reactor type, each comprising a plurality of control windings and a plurality of load windings, and additionally comprising: voltage supply means; circuit means for connecting two of said control windings in each amplifier in magnetic opposition between the amplifier output circuit and said voltage supply means; a pair of asymmetrically conducting devices individually connected in series with one of said opposed control windings in each of said amplifiers, said linear to non-linear change in the input-output characteristic of either amplifier being caused by the termination of electrical conduction through the corresponding one of said connected devices.

7. Control apparatus for a dirigible craft as claimed in claim 6, wherein said circuit means for limiting said first voltage comprises: circuit means connected to said voltage supply so as to establish positive and negative limit voltages; means for modulating said positive and negative limit voltages responsive to said second control voltage; and diode means for shunting-out that portion of said first control voltage that is of greater magnitude than said modulated limit voltages.

8. Control apparatus for a dirigible craft having a control means for controlling attitude thereof, comprising: power means for positioning said control means; first signal providing means normally effective to control said power means; second signal providing means responsive to a condition while the craft changes attitude due to said first signal; third signal providing means responsive to the same condition within a limit for generating a third signal having ordinarily a predetermined relation to said second signal during changes thereof; means for terminating said first signal; and means operated responsive to said second and third signals for operating said terminating means upon change of said ordinarily predetermined relationship due to said condition reaching the limit.

9. Control apparatus for a dirigible craft, comprising; control means for automatically controlling the movement of said craft; circuit means normally completed to operate said control means; an amplifier having input and output circuits and arranged to provide a signal in said output circuit having a constant continuous predetermined relationship or ratio to a varying signal received at said input circuit; means comprising a source of variable magnitude control voltage connected to said input circuit; means connected to said amplifier for changing said constant relationship responsive to said control voltage reaching a predetermined level; and means connected to said amplifier for detecting said change in relationship and opening said circuit means to terminate operation of said control means.

10. Control apparatus for a dirigible craft, comprising: normally energized control means for automatically controlling the movement of said craft; first signal providing means operated responsive to said movement of said craft below an excessive movement to provide a first signal; second signal providing means operated responsive to said movement of said craft to provide a second signal having a predetermined relation to said first signal; means for de-energizing said control means; and means connected to said first and second signal providing means, and operated responsive to termination of said predetermined relation due to an excessive movement of the craft, for operating said de-energizing means to thereby terminate said automatic control of said craft.

11. Control apparatus for a dirigible craft, comprising: normally energized control means for automatically controlling the movement of said craft; signal providing means comprising a source of variable magnitude control voltage; amplifying means having an input circuit connected to said signal providing means, and an output circuit, said amplifying means arranged to provide an output signal having a first relationship to an input signal over a first range of input signals, and an output signal having a second relationship to an input signal over a second range of input signals; means for de-energizing said control means; and means connected to said output circuit and to said de-energizing means for operating said de-energizing means responsive to a predetermined variation in said variable magnitude control voltage, said predetermined variation being effective to cause a change from said first relationship to said second relationship.

12. Control apparatus for a dirigible craft, comprising: normally energized control means for automatically controlling the movement of said craft; signal generating means for generating first and second variable magnitude control signals; first amplifying means having an input circuit connected to said generating means so as to be controlled by said first control signal, and an output circuit, said amplifying means arranged to provide a signal in said output circuit having a linear relationship to said control signal over a first range of first control signals; second amplifying means having an input circuit connected to said generating means so as to be controlled by said second control signal, and an output circuit, said second amplifying means arranged to provide a signal in its corresponding output circuit having a linear relationship to said second control signal over a second range of second control signals; means for de-energizing said control means; and means connected to said output circuits for operating said de-energizing means responsive to failure of said generating means to generate a first or second control signal falling within said first or second control signal range.

13. Control apparatus for a dirigible craft as claimed in claim 12, wherein said first and second output signals are normally equal, and said last mentioned means comprises a saturable reactor amplifier having a pair of magnetically opposed control windings individually connected to said output circuits and a plurality of load windings connected to said de-energizing means, said output signals from said first and second output circuits being normally cancelled by said magnetic opposition so as to have no effect on said load windings.

14. Control apparatus for a dirigible craft, comprising: signal generating means for generating first and second variable magnitude control signals; a first magnetic amplifier comprising a control winding connected to said generating means so as to be controlled by said first control signal, and a plurality of load windings connected to provide first output signal having a normally linear relationship to said first control signal; a second magnetic amplifier having a control winding connected to said generating means so as to be controlled by said second control signal, and a plurality of load windings connected to provide a second output signal having a normally linear relationship to said second control signal; a direct current power supply; a first pair of magnetically opposed bias windings connected between the output circuit of said first magnetic amplifier and said power supply so as to control the load windings of said first magnetic amplifier; means including a first asymmetrically conducting device for terminating the operation of one of said windings in said first pair of opposed windings when said first output signal reaches a predetermined positive level to thereby render the other of said windings of said first pair of opposed windings effective to cause the output signal of said first magnetic amplifier to have a non-linear relationship to said first control signal; a second pair of magnetically opposed bias windings connected between the output of said second magnetic amplifier and said power supply; circuit means including a second asymmetrically conducting device for terminating the operation of one of said windings in said second pair of opposed windings when said output signal of said second magnetic amplifier reaches a predetermined negative level, thereby rendering the other of said windings of said second pair of opposed windings effective to cause the output of said second magnetic amplifier to have a non-linear relationship to said second control signal; control means for automatically controlling the movement of said craft; circuit means for energizing said control means; normally energized relay means for completing said circuit means to thereby normally energize said automatic control means; and a third magnetic amplifier having a plurality of load windings connected to control said relay means and a pair of magnetically opposed control windings individually connected to the output circuits of said first and second magnetic amplifiers, said load windings of said third magnetic amplifier being effective to de-energize said relay means and thereby de-energize said automatic control means responsive to a predetermined difference between the signals received in the control windings of said third magnetic amplifier, said predetermined difference being caused by a failure of said signal generating means to provide either said first or second control signals, or by either said first or second control signals being effective to cause said nonlinear operation of said first or second magnetic amplifiers.

15. Command signal limiter apparatus for a dirigible craft having a control surface for controlling the pitch attitude thereof, comprising: power means for positioning said control surface; first signal providing means comprising a first source of variable magnitude control voltage, normally effective to control said power means and thereby cause operation of said control surface; a transformer comprising a primary and two secondary windings; a pair of diodes connected in series between said secondary windings; a pair of equal load devices connected in series between the other ends of said secondary windings; means for connecting a first direct limit voltage ($E_1$) to the junction of one of said load devices and the connected secondary winding; means for connecting a second direct limit voltage ($E_2$) to the junction of the other load device and the connected secondary winding; circuit means for connecting the junction of said diodes to the junction of said load devices in a common junction point, the potential at said common junction point being equal to $$\frac{E_1+E_2}{2}$$

circuit means for connecting said first source of variable magnitude control voltage to said common junction point, thereby limiting said first signal during an excursion in one direction according to said first limit voltage and during an excursion in the opposite direction according to said second limit voltage; second signal providing means comprising a second source of variable magnitude control voltage connected to said primary winding, thereby varying the direct limit voltages in accordance with said second signal to thereby vary the excursion limits of said first signal.

16. Command signal limiting apparatus for a dirigible craft as claimed in claim 15, wherein said last mentioned means comprises: means for generating a signal corresponding to craft acceleration; means for generating a signal corresponding to craft pitch rate; means for generating a signal corresponding to craft angle of attack; a first summing point; means for combining said angle of attack and pitch rate signals at said first summing point; a second summing point; circuit means for transmitting said acceleration signal to said second summing point when the craft acceleration is negative, and for transmitting the larger of the acceleration signal or the signal at said first summing point to said second summing point when the craft acceleration is positive; means for amplifying and filtering the signal at said second summing point; an alternating supply voltage; and modulating means connected between said last mentioned means and said primary winding of said transformer, said modulating means being effective to modulate the amplified and filtered signal from said second summing point in accordance with said alternating voltage.

17. Command signal limiting apparatus for a dirigible craft as claimed in claim 16, additionally comprising: circuit means for connecting a portion of said direct limit voltages to said second summing point, thereby biasing said second summing point to the potential at said common junction point and causing said variations of said positive and negative excursion limits to be equal.

18. Command signal limiting apparatus for a dirigible craft as claimed in claim 17, additionally comprising: circuit means for connecting a portion of said direct limit signal to said first summing point, to thereby cancel the effect of said acceleration signal when said angle of attack signal is transmitted to said second summing point.

19. Command signal limiting apparatus for a dirigible craft as claimed in claim 18, wherein said selecting circuit means comprises amplifying means for amplifying said signal at said first summing point, and means for comparing said amplified signal with said positive acceleration signal.

20. Control apparatus for a dirigible craft having a control surface for controlling the pitch attitude thereof, comprising: power means for positioning said control surface; first signal providing means normally effective to control said power means; second signal providing means operated responsive to movement of said craft to provide a second signal; amplifying means connected to be operated by said last mentioned means; a transformer having a primary winding and two secondary windings, said primary winding connected to receive said amplified second signal; a pair of asymmetrically conducting devices connected in series between one end of each secondary winding; a pair of load devices connected in series between the other end of said secondary windings; means for biasing the junction of said other end of one secondary winding at a first potential; and said other end of the secondary winding at a second potential; circuit means for connecting said first signal providing means to a common junction of said load and asymmetrically conducting devices, whereby an excursion of said first signal in one direction is limited by one of said asymmetrically conducting devices to said first potential modified by said second signal, and an excursion of said first signal in the other direction is limited by the other of said asymmetrically conducting devices to said second potential modified by said second signal; first and second saturable reactor amplifiers each comprising a plurality of control windings and an output load circuit, and each arranged to provide an output signal in said load circuit having a predetermined relationship to an input signal; circuit means for connecting the input control winding of said first saturable reactor amplifier to said second signal generating means; third signal providing means operated responsive to movement of said craft to provide a third signal; circuit means for connecting the input control winding of said second saturable reactor amplifier to said third signal generating means; circuit means for connecting a pair of said control windings in each of said saturable reactor amplifiers in magnetic opposition between the corresponding load circuit and said biasing means; means including said biasing means for rendering one of said opposed windings in each of said saturable reactor amplifiers nonconductive responsive to the corresponding output signal reaching a predetermined level, to thereby change said relationship; and means connected to said saturable reactor amplifier load circuits for terminating said first signal responsive to a predetermined differential between the output signals from said first and second saturable reactor amplifiers, said change of relationship in either of said amplifiers being effective to cause said differential.

21. Command signal limiting apparatus for a dirigible craft having control means for steering said craft, comprising:

power means for operating said control means;

command signal providing means comprising a source of A.C. signal, said signal normally effective to operate said power means to thereby steer said craft;

a transformer comprising a primary and two secondary windings;

a pair of diodes connected in series between said secondary windings;

a pair of equal load devices connected in series between the other ends of said secondary windings;

means for connecting a first direct voltage to the junction of one load device and the connected secondary winding;

means for connecting a second direct voltage to the junction of the other load device and the other secondary winding;

circuit means for connecting the junction of said diodes to the junction of said load devices, the potential at this common junction point being equal to the average of said direct voltages;

modulating means including said transformer for modulating said direct voltages with an A.C. bias signal having a frequency equal to the frequency of said command signal, and a magnitude equal to said average potential;

second circuit means for connecting said source of command signal to said common junction point, causing one of said diodes to conduct and thereby limit said command signal during an excursion in one direction according to said first modulating direct voltage, and causing said other diode to conduct and thereby limit said command signal during an excursion in the opposite direction according to said second modulated direct voltage, the magnitude of said limited command signal being equal to said first direct voltage when in phase with said A.C. bias signal, and equal to said second direct voltage when out-of-phase with said A.C. bias signal.

22. Command signal limiting apparatus as claimed in claim 21, additionally comprising: means responsive to movement of said craft for generating a signal corresponding to said movement; means including said modulating means for combining said last mentioned signal with said A.C. bias signal to thereby vary the magnitude of said bias signal, the magnitude of said limit signal being thereby reduced for a command signal tending to increase said movement, and increased for a command signal tending to reduce said movement.

23. Command signal limiting apparatus as claimed in claim 21, wherein: said signal corresponding to craft movement is an A.C. signal having the same frequency as said command signal, being in phase with a command signal tending to reduce said movement, and out of phase with a command signal tending to increase said movement.

24. The apparatus of claim 3, wherein the second signal providing means and the third signal providing means are each responsive to a separate flight condition of the draft resulting from displacement of the control surface due to said first control voltage.

25. The apparatus of claim 8 wherein the first, second, and third signals are characterized as being voltage signals and wherein the predetermined relation is the same in sign in algebraic summing of voltages of the second and third signals with the change of said predetermined relationship being unlikeness in sign in algebraic summing of the second and third signals.

26. In flight control apparatus for a dirigible craft having attitude changing means and motor means operating said attitude changing means in response to a control voltage applied to the motor means, means for limiting said control voltage comprising a first source of variable magnitude control signal voltage; a second source of alternating control signal voltage of constant magnitude; circuit means modulating said first signal by means of said second signal to thereby obtain a third control signal voltage of varying magnitude, additionally varying at said alternating rate; a fourth source of direct control signal voltage of constant magnitude; circuit means for combining said fourth signal voltage and said third signal voltage to obtain positive and negative limit voltages, wherein each of said positive and negative voltages is caused to vary in magnitude and rate in accordance with said third signal; and second means for additionally connecting said control voltage to said combining means for preventing said control voltage from becoming greater in magnitude than said positive and negative limit voltages.

27. In flight control apparatus for a dirigible craft having attitude changing means and motor means operating said attitude changing means in response to a control voltage applied to the motor means, in combination: signal limiting means having said control voltage applied thereto and limiting the maximum positive and negative signals that may be applied to said motor means; first signal providing means controlled by a first type flight response of the craft; second signal providing means controlled by a second type flight response of the craft; means comparing the magnitude of like polarity of the first and second type flight response signals; and further means responsive to said comparing means and connected to the signal limiting means modifying the maximum limit of said signal providing means dependent on the larger of said compared signals.

28. The apparatus of claim 27, and additional means connected to said signal limiting means for setting the maximum positive limit at a different value from said negative limit.

29. In flight control apparatus for a dirigible craft having attitude changing means, motor means operating said attitude changing means in response to a control voltage, and means for supplying a control voltage to the motor, in combination: signal limiting means having said control voltage continuously applied thereto and limiting the maximum signal that may be applied from said source of control voltage to said motor means, said signal limiting means comprising means controlled by a flight response of the craft defining a maximum incremental signal that may additionally control the motor means whereby the increase in the control voltage is limited to said increment.

References Cited in the file of this patent

UNITED STATES PATENTS

| | | |
|---|---|---|
| 2,487,793 | Esval | Nov. 15, 1949 |
| 2,642,544 | Feinstein | June 16, 1953 |
| 2,673,314 | MacCallum | Mar. 23, 1954 |
| 2,727,999 | Rusler | Dec. 20, 1955 |
| 2,731,217 | Noxon | Jan. 17, 1956 |
| 2,760,149 | Horton et al. | Aug. 21, 1956 |
| 2,770,429 | Schuck et al. | Nov. 13, 1956 |
| 2,770,770 | Lufcy | Nov. 13, 1956 |
| 2,774,559 | MacCallum | Dec. 18, 1956 |
| 2,798,682 | Alderson et al. | July 9, 1957 |
| 2,869,063 | Hess | Jan. 13, 1959 |
| 2,973,927 | Miller | Mar. 7, 1961 |